United States Patent [19]
Lundborg et al.

[11] Patent Number: 6,070,066
[45] Date of Patent: May 30, 2000

[54] METHODS FOR CELLULAR PAY PHONE/DEBIT PHONE SUPPORT

[75] Inventors: Tomas Lundborg; Benoit Coulombe, both of Stockholm, Sweden

[73] Assignee: Telefonaktieblaget LM Ericsson, Stockholm, Sweden

[21] Appl. No.: 08/826,794

[22] Filed: Mar. 25, 1997

Related U.S. Application Data

[63] Continuation-in-part of application No. 08/772,471, Dec. 23, 1996, abandoned.

[51] Int. Cl.[7] .................................................. H04B 7/00
[52] U.S. Cl. ............................................ 455/406; 455/407
[58] Field of Search ...................................... 455/405, 406, 455/407, 408, 422, 423, 424, 550, 565, 566, 567, 575; 379/114

[56] References Cited

U.S. PATENT DOCUMENTS

| | | |
|---|---|---|
| 5,524,135 | 6/1996 | Mizikovsky et al. . |
| 5,577,100 | 11/1996 | McGregor et al. . |
| 5,749,052 | 5/1998 | Hidem et al. ........................... 455/406 |

FOREIGN PATENT DOCUMENTS

| | | |
|---|---|---|
| 0647055A1 | 4/1995 | European Pat. Off. . |
| 0651586A2 | 5/1995 | European Pat. Off. . |
| 0651586A3 | 5/1995 | European Pat. Off. . |
| 95/20298 | 7/1995 | WIPO . |
| 96 09734 | 3/1996 | WIPO . |

OTHER PUBLICATIONS

Krayem–Nevoux R et al: Payphone Service For Third Generation Mobile Systems Proceedings Of The Global Telecommunications Conference, Houston, Nov. 29–Dec. 2, 1993, vol. 3 of 4, Nov. 29, 1993, Institute Of Electrical And Electronics Engineers, pp. 1708–1712, XP000436103.
EIA/TIA Interim Standard, IS–136.2–A, Mar. 1996, pertinent pages.
"Pay Phone Support in IS–136," Nov. 1995, pertinent pages.
EIA/TIA—IS–54–B, pertinent pages.
TACS Mobile Station–Land Station Compatibility Specification, Issue 4, pertinent pages.

*Primary Examiner*—Thanh Cong Le
*Attorney, Agent, or Firm*—Burns, Doane, Swecker & Mathis, L.L.P.

[57] ABSTRACT

A communications system and a method for providing support for at least one cellular pay phone/debit phone are disclosed. The system has cellular controller for providing cellular communication services to the pay phones/debit phones so as to allow the pay phones/debit phones to communicate with other phones. The system calculates a charge rate for a call being made by a pay phone/debit phone and sends the charge rate to the pay phone/debit phone in a message containing a standard air interface message which is being used in a non-standard manner. The message contains information which allows the pay phone/debit phone to determine the charge rate.

28 Claims, 7 Drawing Sheets

MESSAGE FORMAT

| INFORMATION ELEMENT | REV | TYPE | LENGTH (BITS) |
|---|---|---|---|
| PROTOCOL DISCRIMINATOR | 0 | M | 2 |
| MESSAGE TYPE | 0 | M | 8 |
| REQUEST NUMBER | 0 | M | 4 |
| REMAINING LENGTH | 0 | M | 6 |
| VOICE MESSAGE WAITING | 0 | O | 10-16 |
| SIGNAL | 0 | O | 10-18 |
| CALLING PARTY NUMBER (NOTE 1) | 0 | O | 26-146 |
| OTHER MESSAGES WAITING INFO | 0 | O | 20-170 |
| CALLING PARTY NAME | A | O | 26-514 |
| NOTE 1: 0 TO 2 INSTANCES MAY BE SENT | | | |

FIG. 6

| INFORMATION ELEMENT | | LENGTH (BITS) | |
|---|---|---|---|
| $T_1T_2$ =10 | | 2 | |
| SCC | | 2 | |
| SCC=11 | | SCC≠11 | |
| INFORMATION ELEMENT | LENGTH (BITS) | INFORMATION ELEMENT | LENGTH (BITS) |
| PSCC | 2 | PSCC | 2 |
| EF (=0) | 1 | EF (=0) | 1 |
| RSVD=00000000/ DVCC | 8 | RSVD=0...0 | 4 |
| LOCAL/MSG TYPE | 5 | DTX | 1 |
| ORDQ | 3 | PVI | 1 |
| ORDER | 5 | PI | |
| P | 12 | SI | |
| CPN_RL | | CHAN | 11 |
| CHARACTER | | P | 12 |

WORD 2 - FIRST FLASH WITH INFO WORD

| INFORMATION ELEMENT | LENGTH (BITS) |
|---|---|
| $T_1 T_2 = 01$ | 2 |
| RL_W | 5 |
| CPN_RL | 6 |
| PI | 2 |
| SI | 2 |
| RSVD = 0...0 | 11 |
| P | 12 |

WORD 3 - SECOND FLASH WITH INFO WORD

| INFORMATION ELEMENT | LENGTH (BITS) |
|---|---|
| $T_1 T_2 = 01$ | 2 |
| RSVD = 00 | 2 |
| CHARACTER | 8 |
| CHARACTER | 8 |
| CHARACTER | 8 |
| P | 12 |

WORD N - (N-1)TH FLASH WITH INFO WORD

| INFORMATION ELEMENT | LENGTH (BITS) |
|---|---|
| $T_1 T_2 = 01$ | 2 |
| RSVD = 00 | 2 |
| CHARACTER | 8 |
| CHARACTER | 8 |
| CHARACTER | 8 |
| P | 12 |

FIG. 7

METHODS FOR CELLULAR PAY PHONE/DEBIT PHONE SUPPORT

This application is a continuation-in-part of application Ser. No. 08/772,471, filed on Dec. 23, 1996, abandoned.

FIELD OF THE INVENTION

The present invention relates to a method and apparatus for providing charge rate support for cellular pay phones and debit phones in an analog/digital communications system.

BACKGROUND OF THE INVENTION

In the last ten years, there has been a rapid growth of industry and residences into rural and isolated areas. Thus, more people are having to spend more time in what used to be rural and isolated areas. Since there are more people in these areas now, there is now a need for additional telephone support in these areas. For example, there is a need for pay phones throughout these areas to allow people to make telephone calls. Pay phones are phones in which a user pays for the call using money or credit cards and they are usually placed in public areas. The cellular pay phones are fixedly installed but are connected via radio signals to a cellular system, thus the term cellular pay phone. Debit phones are regular cellular phones with a prepaid number of call credits. Debit phones are typically used in markets where fraud or the occurrence of people not paying their bills is prevalent. Typically, pay phones are connected to land line systems by telephone cables. However, it can be very expensive to run new land line cables to isolated or rural areas which did not previously have land line telephone service. In addition, the cellular provider may want to provide pay phones in areas in which the cellular provider does not have a land line system. Furthermore, the cellular provider may want to provide cellular pay phones on public transportation vehicles such as trains or buses.

FIG. 1 illustrates a cellular communication system which can provide support for cellular pay phones and debit phones. FIG. 1 illustrates 10 cells, C1–C10, of a cellular radio system. For each cell, there is a corresponding base station B1–B10. Remote stations which can either be cellular pay phones, debit phones, or regular cellular phones are shown as M1–M10. Some of the remote stations may be moved within a cell and from one cell to another. A mobile switching center MSC is connected to all of the base stations by cables or other fixed means, like radio signals. The MSC is also connected by cables or links to a fixed public telephone network or a similar fixed communication network. The MSC communicates with the remote stations by sending signals or commands to the base stations wherein the base stations transmit and receive the appropriate signals to and from the remote stations.

One requirement for pay phone/debit phone service is that the pay phones/debit phones need to be given charge rate information, a currency unit per time unit, for each call so that the user will know how much money to deposit into the machine or how much money is going to be charged to a credit or debit card for the call or how many monetary units will be removed from the prepaid amount in the debit phone. Some analog AMPS (Advanced Mobile Phone Service system) operators have introduced pay phones into their cellular networks using Charge Rate Order messages (CRO) to send the charge rate information to the pay phone/debit phone. The Charge Rate Order is a standard function in the British TACS system which happens to also work in AMPS systems but only as a non-standardized proprietary function.

In some systems, the Charge Rate Order is based upon giving the cellular phones a special subscriber category (MCH) which differentiates them from ordinary cellular subscriptions. When a call is made and the mobile switching center detects that the called party has answered the call, the MSC checks the MCH category of the originating phone. If the category indicates that the cellular phone is indeed a pay phone/debit phone, the CRO function within the MSC sends a message to the pay phone/debit phone through the appropriate base station indicating that the called party has answered the call and which charge rate is to be used during the call. However, there are several problems with using charge rate order functions. First of all, the charge rate order is a standard TACS function only and is not standardized in AMPS/D-AMPS systems. Furthermore, when authentication was introduced into AMPS/D-AMPS systems, a spare air interface order code was used for authentication which happens to be the same air interface order code as charge rate order. Thus, the charge rate order message can no longer be used to send the charge rates in AMPS/D-AMPS systems. Finally, charge rate order only worked with analog channels on AMPS systems, which is now a problem since some cellular systems now support both analog and digital channels.

In the Pan-European digital TDMA cellular system known as the Global System for Mobile Communications (GSM), a remote station is supplied with charge advice information (CAI) at the charging point on a per call basis, in a signalling message over the radio interface. The CAI service is provided in the GSM specification as an original/specific service. The remote station receives at the beginning of each call, and as necessary during the call, a message containing the charge advice information. The charge advice information contains a plurality of elements which define various parameters associated with calculating the cost of making the call. The remote station uses the CAI elements to compute an advice of charge (AOC) value for the relevant call.

As noted above, the AMPS/D-AMPS systems do not support charge rate orders. It is not practicable to introduce a specific dedicated message for this function in the AMPS/D-AMPS system for several reasons. First of all, it would require upgraded software not only in the mobile service centers and remote stations, but also in radio base stations. That is, to use a solution according to GSM, all old base stations where a pay phone is to be connected would have to be upgraded. Furthermore, a debit phone roaming into an area served by old, non-upgraded base stations, would not work. Furthermore, it takes time to standardize and implement new messages in the AMPS/D-AMPS system. Thus, there is a need for a solution where only the MSC software and the pay/debit phones need to be upgraded in order to provide appropriate cellular coverage.

SUMMARY OF THE INVENTION

It is an object of the present invention to overcome the problems cited above by providing a method and apparatus for providing pay/debit phone support in analog and digital cellular communication systems by using existing air interface messages in a non-standard manner.

According to one embodiment of the present invention, a communications system which provides support for at least one cellular pay phone/debit phone is disclosed. The system has cellular control means for providing cellular communication services to the pay phones/debit phones so as to allow the pay phones/debit phones to communicate with other phones. The system calculates a charge rate for a call being made by a pay phone/debit phone and sends the charge rate to the pay phone/debit phone in a standard air interface message which is being used in a non-standard manner. The message contains information which allows the pay phone/debit phone to determine the charge rate.

According to another embodiment of the present invention, a method for providing cellular pay phone/debit phone support within a cellular system is disclosed. The cellular system comprises at least one mobile switching center which can be connected to other communication systems and at least one base station controlled by said mobile switching center. A special category code is assigned to each pay phone/debit phone and is stored in the mobile switching center. When a pay phone/debit phone makes a call, the system directs the call from the pay phone/debit phone to a called phone. The mobile switching center then detects when the call is successfully connected to the called phone. The system then checks the category code for the pay phone/debit phone making the call and sends a message to the pay phone/debit phone indicating that the called phone has been successfully connected and a charge rate which will be used during the call. The message is sent to the pay phone/debit phone in a standard cellular air interface message which is being used in a non-standard manner. The message contains information which allows the pay phone/debit phone to determine the charge rate.

BRIEF DESCRIPTION OF THE DRAWINGS

These and other features and advantages of the invention will be readily apparent to one of ordinary skill in the art from the following written description, used in conjunction with the drawings, in which:

FIG. 6 illustrates the format of a Mobile Station Control Message Word on the Analog Voice channel;

FIG. 7 illustrates the format of Flash With Info words on the Analog Voice channel;

DETAILED DESCRIPTION

Although the description hereinafter focuses on systems which comply with IS-136 and its predecessors (IS 54B, EIA 553, etc.), the principles of the present invention are equally applicable to a variety of wireless communication systems, e.g. cellular and satellite radio systems, irrespective of the particular mode of operation (analog, digital, dual-mode, etc.), the access technique (FDMA, TDMA, CDMA, hybrid FDMA/TDMA/CDMA, etc.), or the architecture (macrocells, microcells, picocells, etc.). As will be appreciated by one skilled in the art, the logical channel which carries speech and/or data may be implemented in different ways at the physical layer level. The physical channel may be, for example, a relatively narrow RF band (FDMA), a time slot and a radio frequency (TDMA), a unique code sequence (CDMA), or a combination of the foregoing. For purposes of the present invention, the term "channel" means any physical channel which can carry speech and/or data, and is not limited to any particular mode of operation, access technique or system architecture.

Figure 1:
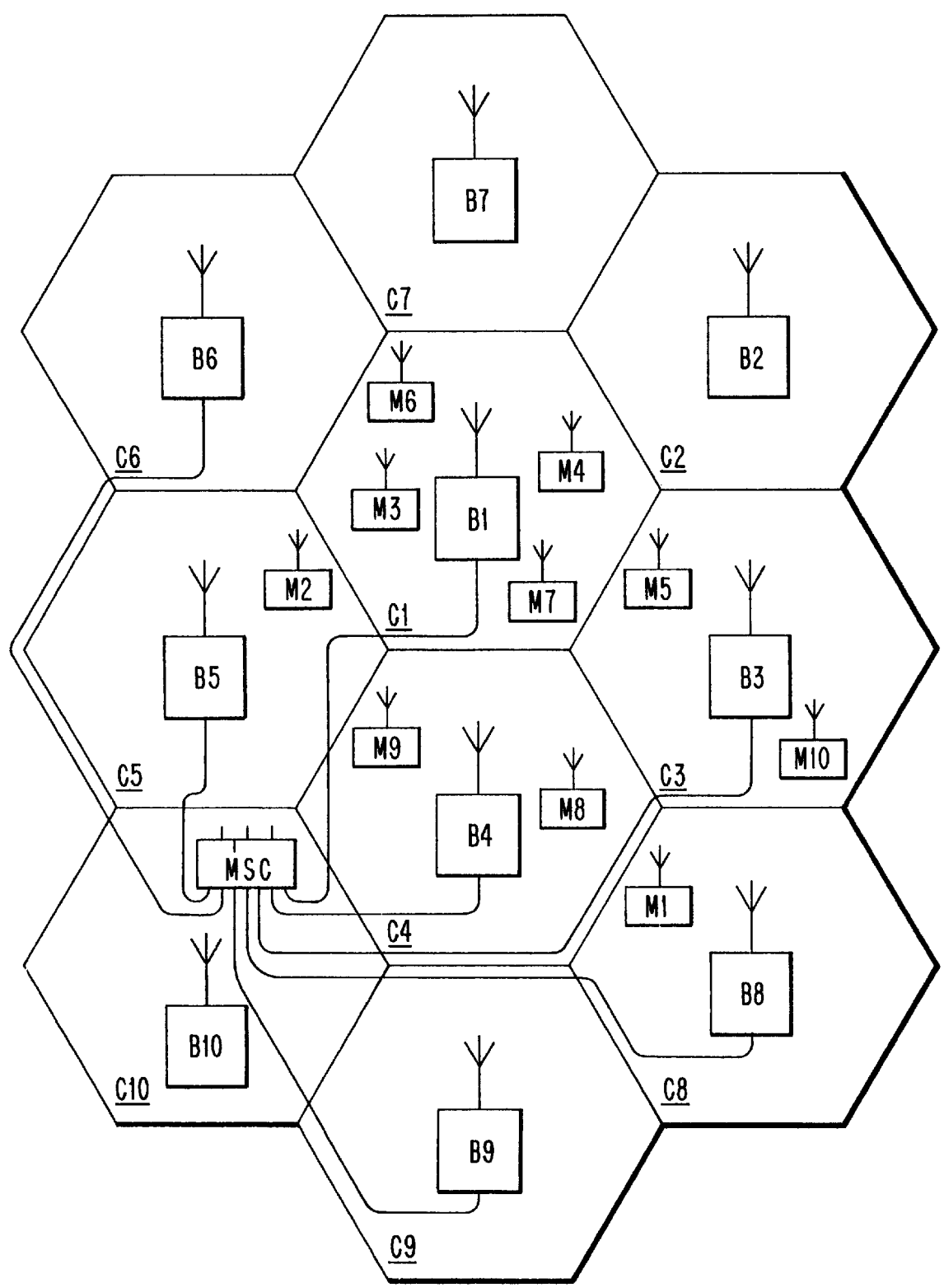
FIG. 1 illustrates a mobile telephony communication system.
Figures 2, 8:
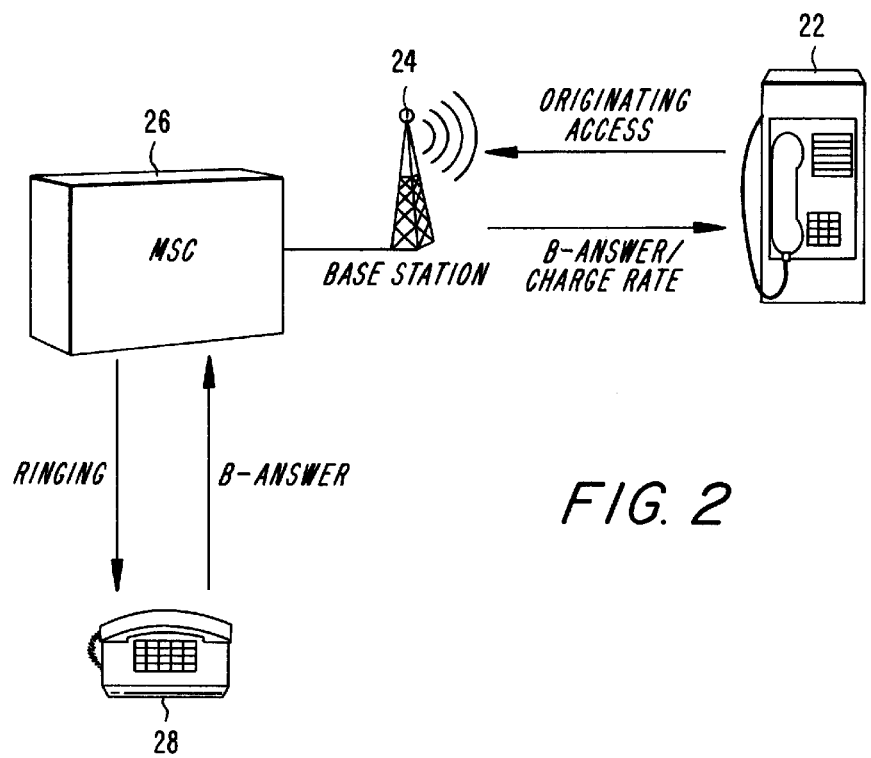
FIG. 2 illustrates a cellular communication system with cellular pay phones/debit phones according to one embodiment of the present invention.
FIG. 8 illustrates the format of a digital Flash With Info message.

FIG. 2 illustrates a cellular communication system with cellular pay phone/debit phone support according to one embodiment of the present invention. In FIG. 2, a pay phone/debit phone 22 communicates with a mobile switching center 26 via a base station 24 in the same manner as a conventional cellular station. The mobile switching center 26 can be connected to a variety of other communication systems like the fixed public telephone network so as to allow the user of the pay phone/debit phone 22 to contact any phone regardless of whether the phone is in the cellular system.

As noted above, pay phones/debit phones like the ones illustrated in FIG. 2 require the cellular system to send the pay phone/debit phone information regarding how much to charge the customer for each time unit that has passed since the connection of the call. This is referred to as charge rate information.

The invention will be further described with reference to FIG. 3 which illustrates a flow chart for pay phone/debit phone support. In order to allow the MSC to distinguish regular phones from pay phone/debit phones, the pay phone/debit phones are assigned special codes when they are defined/activated in the MSC. In some systems, different types of phones are assigned to specific mobile charging (MCH) subscriber classes, e.g. MCH-0, MCH-1, etc.. Thus, for example, a regular subscriber which does not need charge rate information can be assigned to subscriber class MCH-0 while pay phones/debit phones can be assigned to subscriber class MCH-2. The codes are stored in the MSC and can be referenced whenever a call is made.

Figure 3:
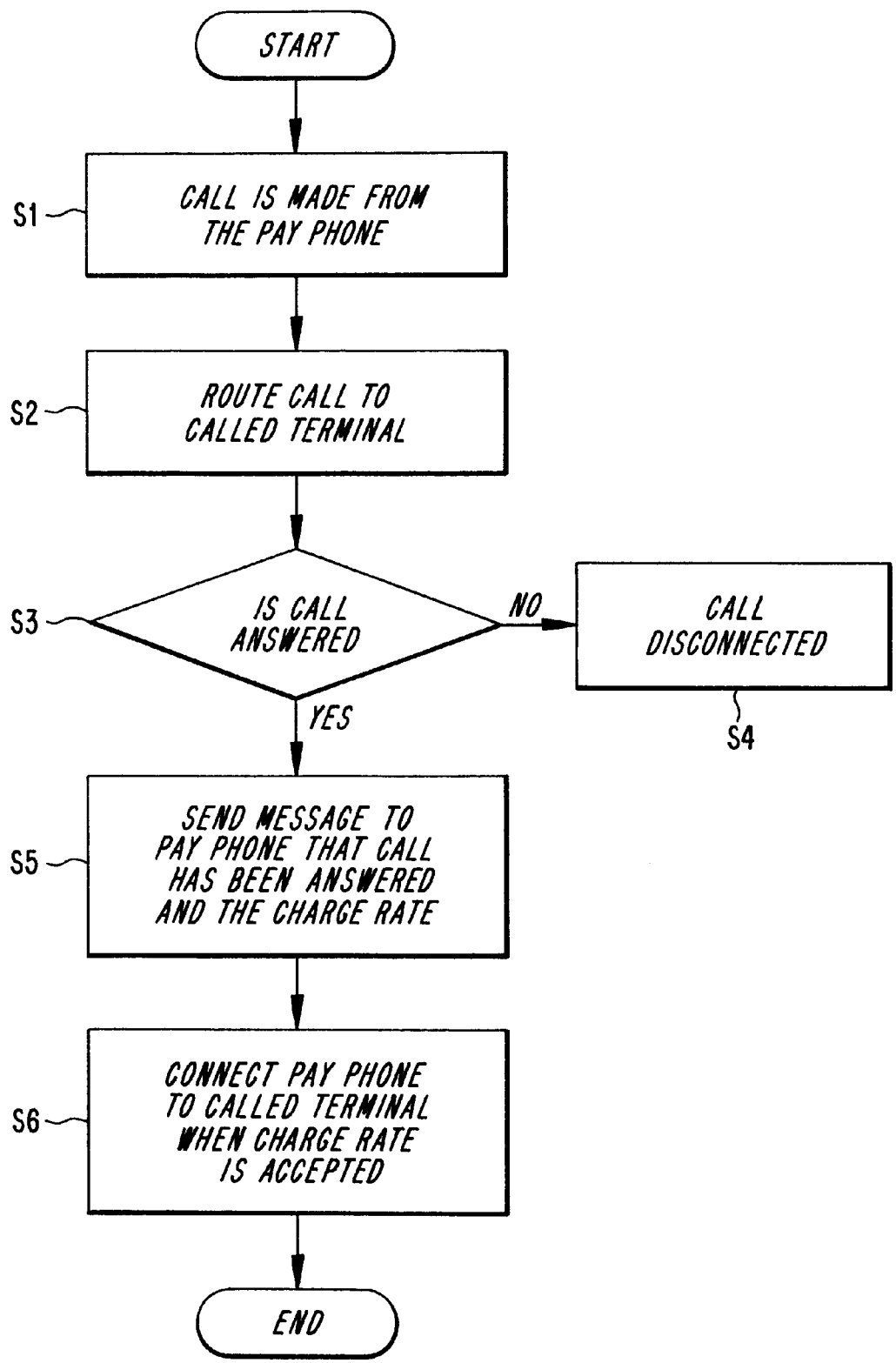
FIG. 3 is a flow chart illustrating cellular pay phone/debit phone support with air interface messages.

When a call is made from the pay phone/debit phone in step S1 of FIG. 3, the base station receives the call request and forwards the call request to the MSC. The MSC then forwards the call to the called phone in a known manner in step S2. The MSC then detects whether or not the call is answered in step S3. If the call is not answered, the call is disconnected in step S4. However, if the call is answered, the MSC checks the pay phone/debit phone's mobile charging subscriber class and determines the charge rate that needs to be employed by the pay phone/debit phone. The MSC then sends a signal to the base station indicating that the call has been answered and what charge rate to use for the call. The base station then sends the charge rate information to the pay phone/debit phone using standard cellular air interface messages in a non-standard manner in step S5. The pay phone/debit phone is then connected to the called phone once the charge rate has been accepted in step S6.

Air interface messages have been designed to carry out specific functions or applications as set forth in various standards. In the present invention, some air interface messages are used for functions other than those assigned by the standards. Thus, the air interface messages are used in a non-standard manner.

Suitable messages for use in a non-standard manner are those messages which can be used in a non-standard manner without disturbing the standard usage of the message. For example, the Calling Party Number mechanism or Voice Message Waiting mechanism can be used to send the charge rate information between the MSC and the base station. The base station will use the Flash With Info message on digital traffic channel or the mobile station control message on analog voice channel, both of which are standard cellular air interface messages, can be used to send the charge rate information between the base station and the pay phone/debit phone.

Figure 4:
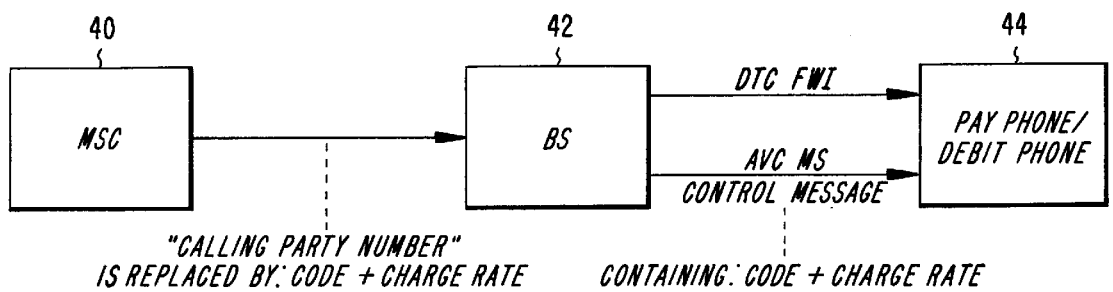
FIG. 4 illustrates the signalling between a MSC, base station and a pay phone/debit phone according to one embodiment of the present invention.

The Calling Party Number mechanism is normally used for sending the phone number of the calling party for display. The Calling Party Number information can be replaced by charge rate information if a code is added so the pay phone/debit phone can understand that this information is charge rate information. As illustrated in FIG. 4, the MSC sends a signal to the base station wherein the Calling Party Number is replaced by a special string of characters and the charge rate. For the digital traffic channel the base station 42 then sends a Flash With Info message which contains the charge rate and the special string of characters in the calling party number field to the pay phone/debit phone 44.

For the analog voice channel, the base station 42 then sends a mobile station control message with the Order code Flash With Info and the charge rate and the special string of characters is contained in the character fields of the Flash With Info words. The special string of characters is a unique code that is not part of a regular phone number. An example of a special string of characters is "##" and is needed to allow pay phone/debit phones to differentiate between Calling party Number and charge rate. In other words, the pay phone/debit phones are programmed to interpret Calling Party Number as a charge rate information.

Figure 5:
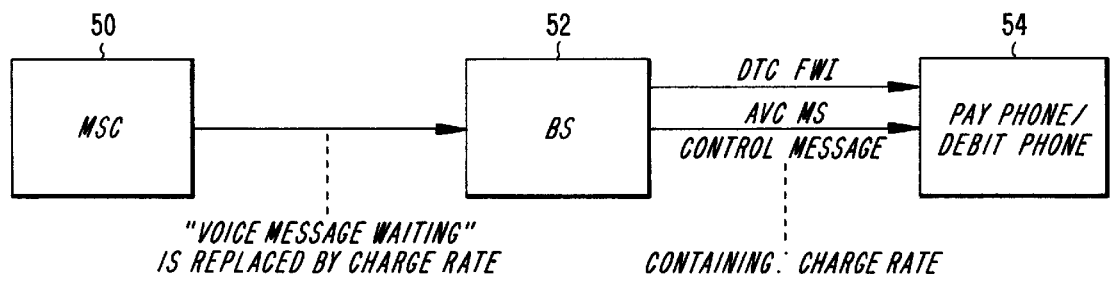
FIG. 5 illustrates the signalling between a MSC, base station and pay phone/debit phone according to another embodiment of the present invention.

Likewise, the Voice Message Waiting mechanism is normally used by the MSC in some cellular systems to notify a subscriber that a number of voicemail messages are waiting for retrieval. However, in the present invention, the Voice Message Waiting mechanism can be used to send the charge rate information to pay phones/debit phones as many times as needed. As illustrated in FIG. 5, the MSC 50 sends a signal to the base station 52 wherein the Voice Message Waiting information is replaced by the charge rate. When on the analog voice channel, the base station 52 then sends a mobile station control message with order qualifier Voice Message Waiting to the pay phone 54 wherein the charge rate is contained in the Message Type field. When on the digital traffic channel the base station 52 then sends a FWI message to the pay phone 54 wherein the charge rate is contained in the Voice Message Waiting field. In other words, pay phones/debit phones are programmed to interpret Voice Message Waiting information as charge rate information.

There are several advantages with using existing Air Interface messages in a non-standard manner instead of implementing new messages to send the charge rate information to the pay phones/debit phones. First of all, development cost is lower since changes are only needed on the application level, while lower protocol levels do not need to be changed. In addition, as mentioned above, all old base stations do not need to be upgraded. The implementation may be made now without waiting for new revisions of the standard. Furthermore, the cost of the pay phone/debit phone is lower due to less processor load, less design complexity, and memory requirements. Finally, using existing air interface messages in a non-standard manner will not seriously impact standard mobile stations if they receive this message by error.

For analog voice channels, the Voice Message Waiting and the Flash With Info are both sent to the pay phone/debit phone using a mobile station control message hose structure is illustrated in FIG. 6. The interpretation of a mobile station control message is determined by an order field in the mobile station control message. In one embodiment, an order field set to 10010 is interpreted to be a Flash With Info, while an order field set to 00101 is interpreted to be a Voice Message Waiting, but the present invention is not limited thereto. For the situation where the Voice Message Waiting is being used to send the charge rate information to the pay phone/debit phone, the charge rate information is contained in the Local/Message Type field. Thus, when a pay phone/debit phone receives a mobile station control message which is interpreted as a Voice Message Waiting, the pay phone/debit phone interprets the information contained in the Local/Message Type field as the charge rate information. Alternatively, for the situation where the Calling Party Number mechanism is used to transmit the charge rate information to the pay phone/debit phone, the charge rate information is placed in character fields in subsequent Flash With Info words. The structure of the Flash With Info words is disclosed in FIG. 7. Thus, when a pay phone/debit phone interprets a mobile station control message as being a Flash With Info, the pay phone/debit phone will look to the character fields of the subsequent Flash With Info words so as to obtain the charge rate information.

According to another embodiment of the present invention, the charge rate information can be contained within the Flash With Info words of a mobile station control message with Order Code Flash with Info and be indicated to the pay phone/debit phone using a different order qualifier code. The current Flash With Info order qualifier code is 000. However, according to the present invention, the pay phone/debit phone can be programmed in such a way that when it receives an order qualifier code which is not the appropriate code, for example, 001, the mobile station determines that the message contains charge rate information. In this embodiment, the base stations will have to be updated to set the new order qualifier codes as being indicative of the charge rate information. In this case the special string of characters used to indicate the charge rate is not needed. It will be understood by one skilled in the art that other order qualifier codes can be used to indicate charge rate information so long as the order qualifier code is not the code which has already been assigned to a specific action.

According to another embodiment of the present invention, charge rate information can also be sent on digital voice channels using available information element fields within the Flash With Info message. The format of the Flash With Info message is illustrated in FIG. 8. As illustrated in FIG. 8, the Flash With Info message contains a plurality of information elements. If the Voice Message Waiting mechanism is being used, the charge rate information is transmitted in the Voice Message Waiting information element of the Flash With Info Message. Alternatively, if the Calling Party Number mechanism is being used, the charge rate information is transmitted in the Calling Party Number information element field of the Flash With Info message.

Alternatively, a new information element field can be added to the Flash With Info message which is specifically designed to carry the charge rate information. In this embodiment, the base stations will have to be updated to set the new information element field.

Figure 9:
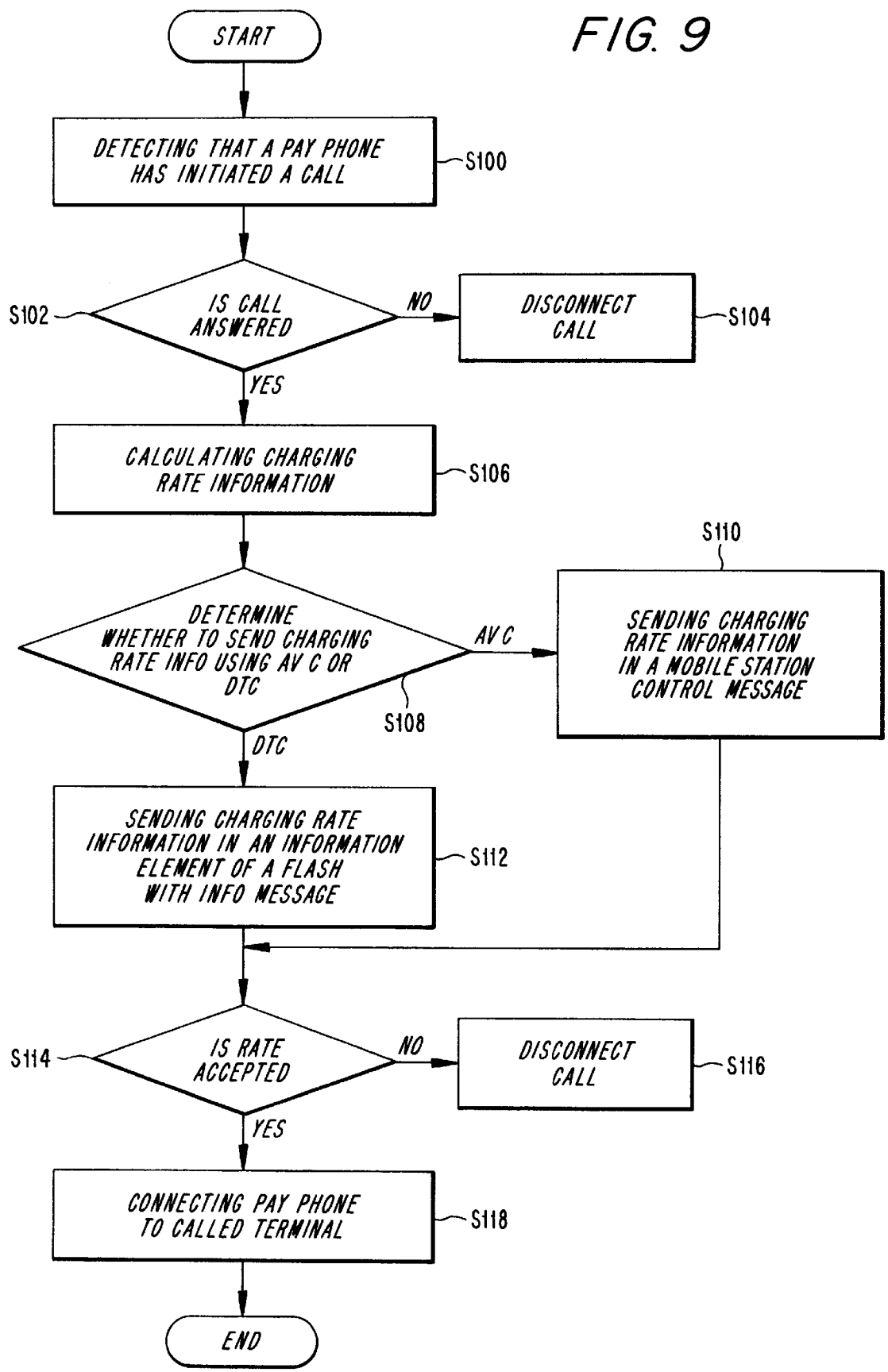
FIG. 9 is a flow chart describing the actions of the communications system according to one embodiment of the present invention.

The operation of the communication system will now be described with reference to FIG. 9. In this embodiment, the mobile switching center detects that the pay phone/debit phone initiates a call to a terminal in step 100. The mobile switching center then forwards the call to the called terminal in a known manner. The mobile switching center then detects whether or not the call has been answered in step S102. If the call is not answered, the call is disconnected in step S104. If the call is answered, the mobile switching center calculates the charge rate information for the call in a known manner. The mobile switching center then determines whether to send the charge rate information to the pay phone/debit phone using either an analog voice channel or a digital traffic channel depending on the capabilities of the pay phone/debit phone and the capacity of the system in step S108. If the mobile switching center decides to send the charge rate information using an analog voice channel, the charge rate information is sent in a mobile station control message as described above, in step S110. However, if the mobile switching center decides to send the charge rate information using a digital traffic channel, the charge rate information is sent to the pay phone/debit phone in a field of the Flash With Info message as described above, in step S112. In either case, the system determines whether the rate has been accepted by the user of the pay phone/debit phone, in step S114. If the rate is not accepted, the call is disconnected in step S116. However, if the rate is accepted, the mobile switching center connects the pay phone/debit phone to the called terminal in step S118.

Figure 10:
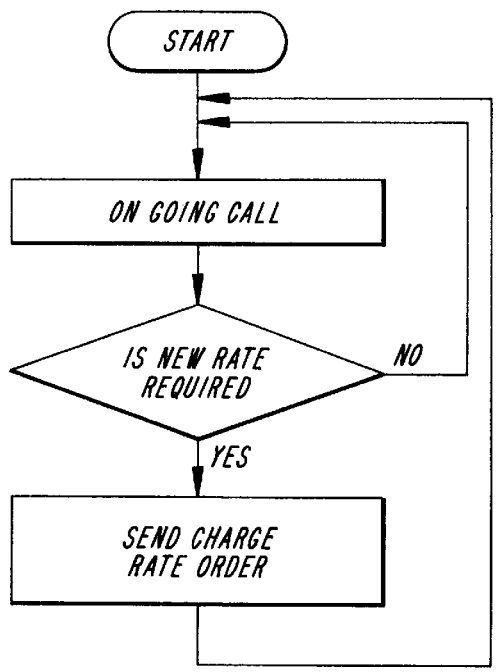
FIG. 10 is a flow chart describing the updating of the charge rate during a call.

Furthermore, the charge rate may need to be changed during a call because of various parameters such as handoff, time of day, changed charging areas, etc. When a new rate is needed during a call, the base station sends a charge rate order to the pay phone/debit phone using one of the methods described above and as illustrated in FIG. 10.

The Flash With Info and mobile station control message air interface messages can also be used to implement an "Advice of Charge" functionality within the cellular system. The "Advice of Charge" function allows the served pay phone/debit phone to be informed of the charge for a utilized service. The pay phone/debit phone can receive the Advice of Charge message at the beginning of each call and during the call if it is needed. The Advice of Charge message is sent to the pay phones/debit phones in the same manner that the charge rate information is sent to the pay phones/debit phones in the embodiments described above. When the pay phone/debit phone determines that it has received the Advice of Charge message, the pay phone/debit phone displays the charge information on a display screen. In most of the solutions described above, this can be done without updating the base stations. If the Calling Party Number mechanism is used and the Charge Rate (and the special string of characters) are sent as readable characters then no modifications are needed in existing mobile stations to display the Advice of Charge message. However, in the GSM system, the base station will have to be updated to provide this service.

It will be appreciated by those of ordinary skill in the art that the present invention can be embodied in other specific forms without departing from the spirit or central character thereof. The present disclosed embodiments are therefore considered to be illustrative and not restrictive. The scope of the invention is indicated by the appended claims rather than the foregoing description and all changes which come within the meaning and range of equivalents thereof are intended to be embraced therein.

What is claimed is:

1. A communications system which provides support for at least one cellular pay phone/debit phone, comprising:

cellular control means for providing cellular communication services to said pay phones/debit phones so as to allow the pay phones/debit phones to communicate with other phones;

means for calculating a charge rate for a call being made by a pay phone/debit phone; and means for sending said charge rate to said pay phone/debit phone in a standard air interface message which is being used in a non-standard manner and which contains information which allows the pay phone/debit phone to determine the charge rate.

2. A communications system according to claim 1, wherein said charge rate is sent to said pay phone/debit phone on an analog voice channel using a mobile station control message having an order code.

3. A communications system according to claim 2, wherein said Order Code is a Voice Message Waiting.

4. A communications system according to claim 2, wherein said charge rate is contained within Local/Message Type field within said mobile station control message.

5. A communications system according to claim 2, wherein said Order Code is a Flash With Info.

6. A communications system according to claim 2, wherein said charge rate is contained in character fields of the Flash With Info.

7. A communications system according to claim 6, wherein a special string of characters is inserted at the beginning of the character field and the charge rate is contained in the remaining characters of the character field, wherein said special string of characters alerts said pay phone/debit phone that the mobile station control message contains said charge rate.

8. A communications system according to claim 6, wherein an order qualifier code indicates that the character field contains a charge rate.

9. A communications system according to claim 1, wherein said charge rate is sent to said pay phone/debit phone on a digital voice channel.

10. A communications system according to claim 9, wherein said charge rate is transmitted in an information element of a Flash With Info message.

11. A communications system according to claim 9, wherein said charge rate is transmitted in a Voice Message Waiting Information element of a Flash With Info message.

12. A communications system according to claim 9, wherein said charge rate is transmitted in a Calling Party Number information element of a Flash With Info message.

13. A communications system according to claim 12, wherein a special string of characters is inserted at the beginning of the Calling Party Number field and the charge rate is contained in the remaining digits of the Calling Party Number field, wherein said special string of characters alerts said pay phone/debit phone that the Flash With Info message contains said charge rate.

14. A communications system according to claim 1, wherein said charge rate information is displayed on a display screen on said pay phone/debit phone.

15. A method for providing cellular pay phone/debit phone support within a cellular system, said cellular system comprising at least one mobile switching center which can be connected to other communication systems and at least one base station controlled by said mobile switching center, comprising the steps of:

assigning a special category code to each pay phone/debit phone and storing said codes in said mobile switching center;

directing a call from one of said pay phones/debit phones to a called phone;

detecting at said mobile switching center when the call is successfully connected to the called phone;

checking said category code for the pay phone/debit phone making the call; and sending said charge rate to said pay phone/debit phone in a standard air interface message which is being used in a non-standard manner and which contains information which allows the pay phone/debit phone to determine the charge rate.

16. A method according to claim 15, wherein said charge rate is sent to said pay phone/debit phone on an analog voice channel using a mobile station control message having an order code.

17. A method according to claim 16, wherein said Order Code is Voice Message Waiting.

18. A method according to claim 16, wherein said charge rate is contained within Local/Message Type within said mobile station control message.

19. A method according to claim 16, wherein said Order Code is a Flash With Info.

20. A method according to claim 16, wherein said charge rate is contained in character fields of the Flash With Info message.

21. A communications system according to claim 20, wherein a special string of characters is inserted at the beginning of the character field and the charge rate is contained in the remaining characters of the character field, wherein said special string of characters alerts said pay phone/debit phone that the mobile station control message contains said charge rate.

22. A method according to claim 19, wherein an order qualifier field within the Flash With Info message indicates a charge rate.

23. A method according to claim 15, wherein said charge rate is sent to said pay phone/debit phone on a digital voice channel.

24. A method according to claim 23, wherein said charge rate is transmitted in an information element of a Flash With Info message.

25. A method according to claim 23, wherein said charge rate is transmitted in a Voice Message Waiting Information element of a Flash With Info message.

26. A method according to claim 23, wherein said charge rate is transmitted in a Calling Party Number information element of a Flash With Info message.

27. A method according to claim 26, wherein a special string of characters is inserted at the beginning of the Calling Party Number field and the charge rate is contained in the remaining digits of the Calling Party Number field, wherein said special string of characters alerts said pay phone/debit phone that the Flash With Info message contains said charge rate.

28. A method according to claim 15, wherein said charge rate is displayed on a display screen on said pay phone/debit phone.

* * * * *